United States Patent
Dell et al.

[15] 3,643,491
[45] Feb. 22, 1972

[54] DERIVATIVE DIFFERENTIAL SCANNING MICROCALORIMETER

[72] Inventors: Curtis G. Dell; Dennis W. Janzen, both of Newark, Del.; John D. McGhee, Plymouth Meeting, Pa.

[73] Assignee: E. I. du Pont de Nemours and Company, Wilmington, Del.

[22] Filed: Oct. 11, 1968

[21] Appl. No.: 766,857

[52] U.S. Cl. ............................................................73/15 B
[51] Int. Cl. .............................................................G01n 25/00
[58] Field of Search ........................................73/15, 432 RC

[56] References Cited

UNITED STATES PATENTS

| | | | |
|---|---|---|---|
| 2,573,596 | 10/1951 | Offner | 73/359 |
| 2,690,647 | 10/1954 | Woodward | 60/243 |
| 2,755,999 | 7/1956 | Vickers | 236/69 |
| 3,263,484 | 8/1966 | Watson et al. | 73/15 |

Primary Examiner—Charles A. Ruehl
Assistant Examiner—Herbert Goldstein
Attorney—Herbert M. Wolfson

[57] ABSTRACT

A scanning differential microcalorimeter in which energy is differentially supplied to a reference and sample in an effort to equalize their temperatures. A signal proportional to the difference in energy flows is produced and its derivative obtained and added to this signal to correct for the lag in the difference signal.

6 Claims, 8 Drawing Figures

PATENTED FEB 22 1972      3,643,491

INVENTORS
CURTIS G. DELL
DENNIS W. JANZEN
JOHN D. MC GHEE

ATTORNEY

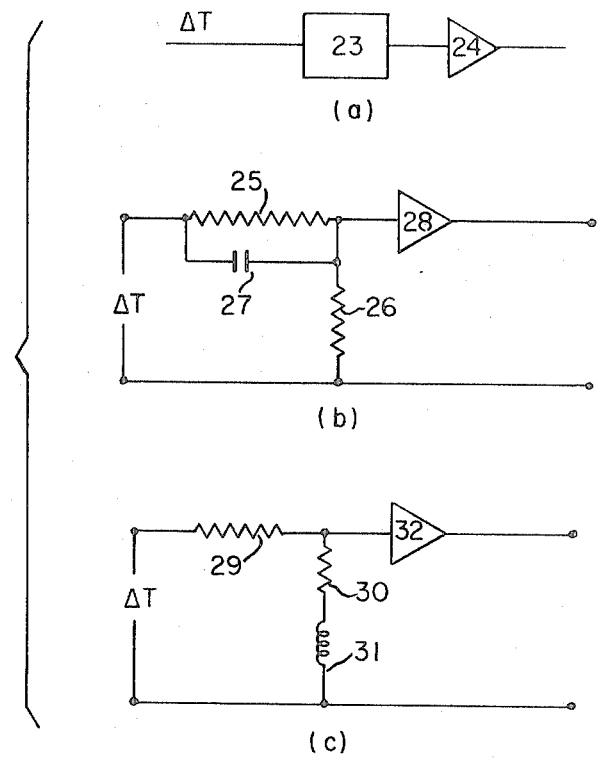
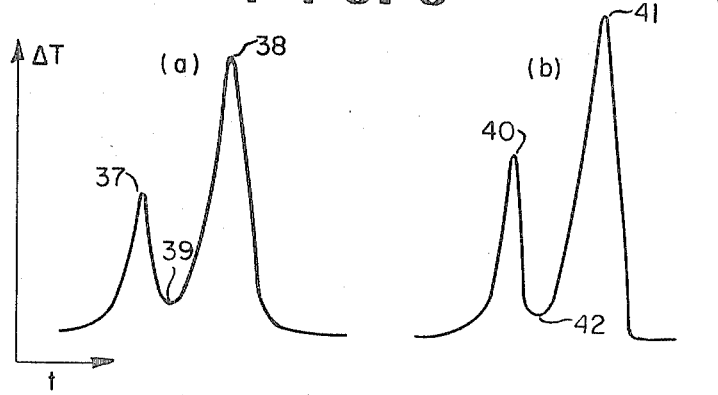
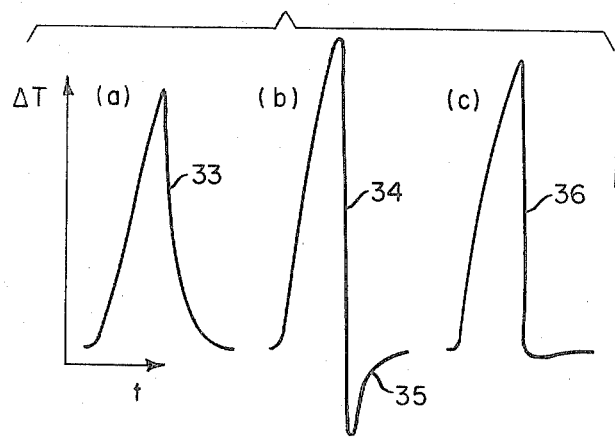

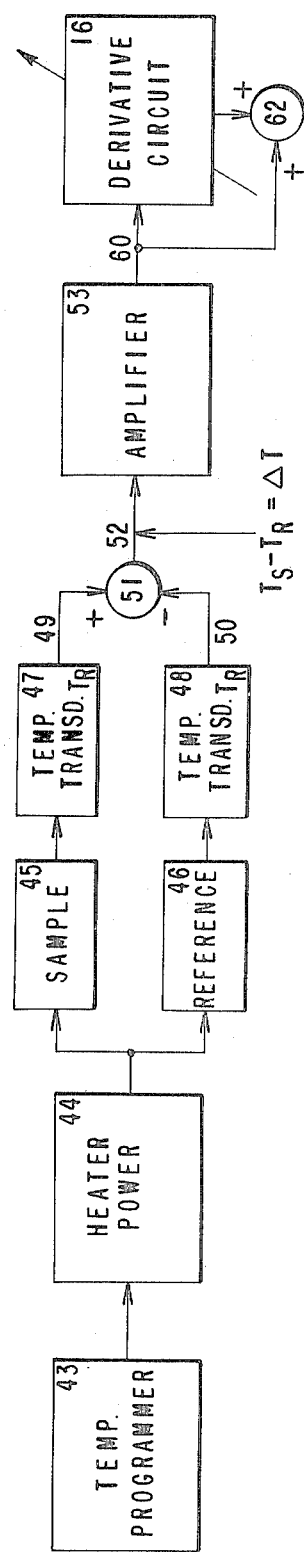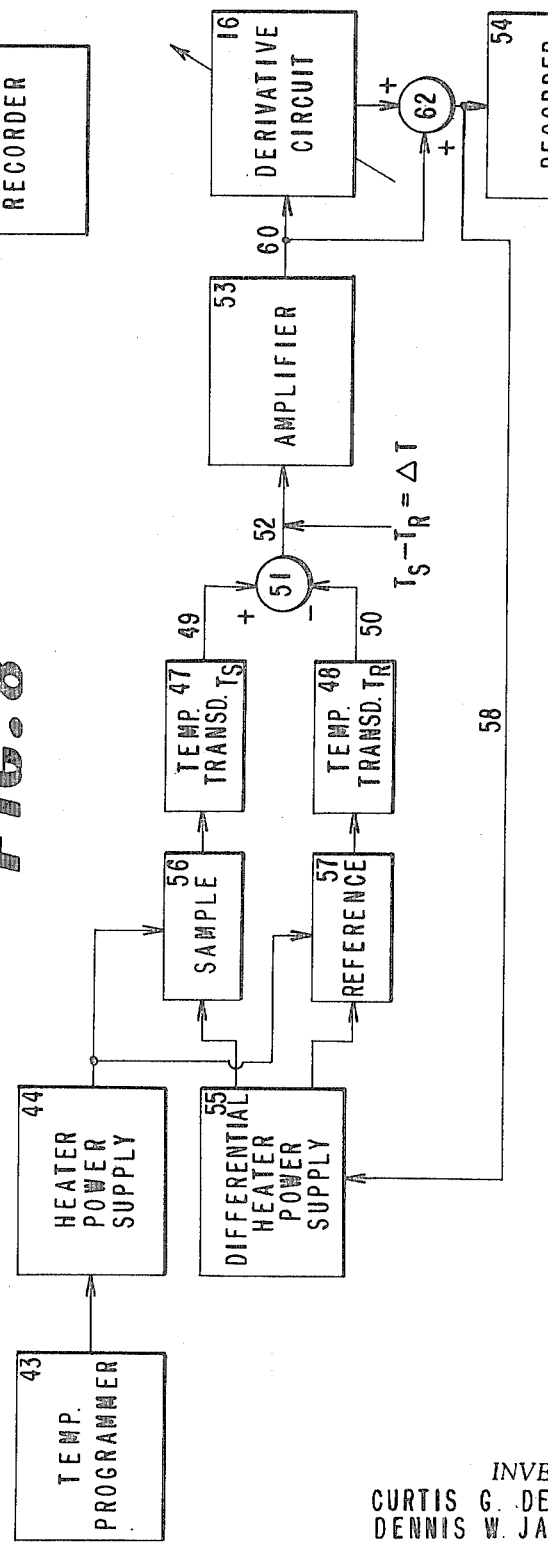

DERIVATIVE DIFFERENTIAL SCANNING MICROCALORIMETER

BACKGROUND OF INVENTION

There are numerous instruments, generally called analytic instruments, which are designed to monitor a sample system, usually with a transducer, and to generate a signal proportional to the response of that transducer to any change that takes place in the sample system. It would be desirable if the signal generated by these instruments were proportional to the change in the sample system itself, but usually the signal is distorted. This distortion takes various forms. There is generally a lag, called a lagging phase shift, between the response of the instrument to the change in the sample system and the actual change in the sample system. If the change in the sample system is monotonic, this is the full extent of the distortion. If, however, the change in the sample system is of short duration, after which the sample system returns to equilibrium, then a second distortion occurs. Instead of following the return of the sample system to equilibrium, the response signal decays to equilibrium in a time characteristic of the measuring system; not the sample system. Since the response still lags the change, however, this can still be referred to as a lagging phase shift.

These distortions take place in the signals of a wide variety of instruments, and the effect of the distortions is as varied as the instruments themselves. Generally, however, we can distinguish two effects which are particularly troublesome. If a sample system, subject to a change in environment, undergoes a single reaction to that change, then the phase shift in the instrument's response to that reaction makes it difficult to determine where the reaction begins and where it ends. If the sample undergoes several reactions, within a narrow range of the environment change, then the problem is compounded by the fact that due to the phase shift and the independent decay of the response, the reactions are difficult to resolve from one another.

It has long been recognized, by those skilled in the art, that such distortions, with their consequent loss of resolution, are due to the inherent reactive nature of the measuring instrument. In instruments where thermal measurements are being made, for example, this reactance can be attributed to the thermal resistance and the thermal capacitance of the measuring circuit. The decay has long been recognized as an exponential decay, with time constant equal to the time constant of the reactance of the measuring system. This fact can be substantiated mathematically. The generalized heat balance equation for a thermal analysis instrument is:

$$dh/dt = C_s dT_s/dt - dq/dt \quad (1)$$

where
$dh/dt$ is the instantaneous rate at which heat is generated in the sample,
$dq/dt$ is the instantaneous rate at which thermal energy flows to or from the system,
$C_s$ is the heat capacity of the sample, and
$T_s$ is the temperature of the sample as measured by the instrument.

The rate at which heat is lost to the surrounding is given by the thermal analog of Ohm's law:

$$dq/dt = (T_p - T_s)/R \quad (2)$$

where
$T_p$ is the temperature of the thermal source as measured by the instrument, and
$R$ is the thermal resistance of the heating path. Combining the two yields:

$$dh/dt = C_s dT_s/dt + (T_s - T_p)/R \quad (3)$$

This is a generalized heat balance equation which is difficult to solve without the boundary conditions imposed on it by specific instruments. The presence of $R$ and $C_s$ in the equation, however, would lead those skilled in the art to the realization that the phase shift and the decay of the response signal are due to the thermal reactance of the system.

Having determined this, one way of handling the distortion is to construct instruments with lower thermal resistance and capacitance or to measure other parameters such as energy flow, rather than temperature, where the time constant is smaller and the distortion less. Another way in which this problem can be handled is by manually making a graphical correction on the chart containing the instrument response.

This invention relates to an entirely new way of approaching the problem. In this invention, rather than change the time constant of the system or change the parameters to be measured, the distorted signal is itself modified, automatically, so that the resultant signal is proportional to the actual change as it occurs.

At this point, for purpose of convenience, the discussion will be restricted to thermometric measurements, or more specifically to a scanning microcalorimeter. This restriction is for purposes of illustration only, and is not meant to limit the scope and/or use of the invention. The scanning microcalorimeter is chosen for this purpose, partially because the effects of the distortion are particularly troublesome in this instrument, and partially because equation (3) can be easily specialized to this instrument.

How this invention works, and how it can be applied to the scanning microcalorimeter can best be illustrated with reference to the following figures, wherein:

FIG. 4 shows two other possible embodiments of the present invention.

FIG. 5 is a comparison between the response of an unmodified instrument and the response of an instrument to which this invention has been applied.

FIG. 6 is a comparison between the resolution of an unmodified instrument and the resolution of an instrument to which this invention has been applied.

FIG. 7 is a block diagram of one type of scanning microcalorimeter.

FIG. 8 is a block diagram of another type of scanning microcalorimeter.

DISCUSSION OF THE DRAWINGS

Figure 1:
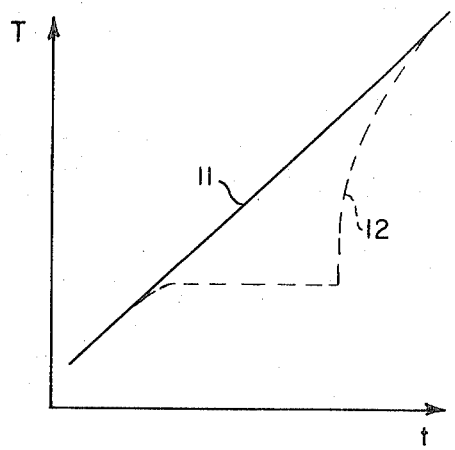
FIG. 1 is a typical plot of temperature versus time for both sample and reference material in a scanning microcalorimeter—one of the instruments to which this invention can be applied.

A scanning microcalorimeter measures the temperature at which a phase change takes place within a sample, and the energy associated with that phase change, by comparing the temperature history of the sample with that of an inert reference, as the temperature of the environment in which they are contained is varied. FIG. gives a block diagram of one type of differential scanning microcalorimeter wherein a temperature programmer 43 controls the heater power supply 44, which in turn powers equally resistance heater with sample cell 45 for the sample material and resistance heater with reference cell 46 for the reference material. Transducer 47 monitors the temperature $T_S$ of the sample material and feeds it through conduit 49 to a point 51 where the temperature of the reference $T_R$, obtained by transducer 48 and fed along conduit 50 is substracted from it. The difference signal $\Delta T$ is fed along conduit 52 to the amplifier 53. Part of the output of the amplifier 53 is passed to a derivative circuit 16 which obtains the first derivative of the signal and is shown in greater detail in FIG. 3. This derivative is then added to the remainder of the signal from the amplifier 53, at point 62 which is then passed to the recorder 54.

FIG. 8 shows another type of differential scanning calorimeter similar to that in FIG. 7 except that it contains, as an additional element, the differential heater power supply 55 which differentially powers the sample heater 56 and the reference heater 57; this heating difference is controlled by the output at the point 62 through the conduit 58, to supply greater energy to whichever of the sample and reference materials has the lower temperature so that the two materials achieve the same temperature. One of the inputs to the point 62 is supplied by the amplifier 53 and the other input comes from a derivative circuit 16, which thus corrects the output of the amplifier 53 for the lag in the measured temperature difference at point 51.

Alternatively a passive network as in FIG. 4 may substitute for the active network in FIGS. 7 and 8, by making it the sole connection between points 60 and 62.

With reference to FIG. 1, wherein the solid curve 11 is the indicated temperature history of the reference and the dotted curve 12 is the indicated temperature history of the sample, it is evident that initially the two curves are identical. As the reaction leading to the change in phase begins, however, the two curves diverge, because the sample departs from thermal equilibrium with its environment due to the effect of the phase change, while the reference sample does not. The difference in temperature between them is $\Delta T$.

Figure 2:
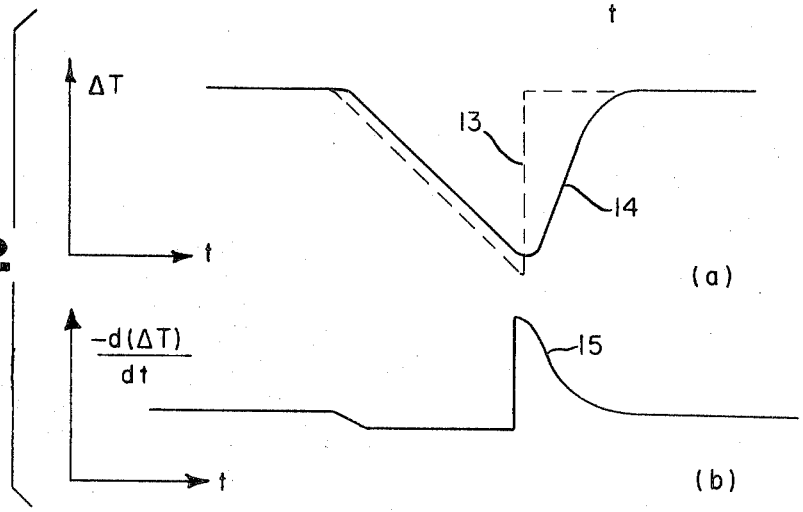
FIG. 2 is a comparison between the actual temperature differential between sample and reference in a scanning microcalorimeter and the response of that instrument to that temperature differential.

Referring to FIG. 2a the dotted curve 13 represents the actual difference in the temperature, $\Delta T$, between the sample and reference materials. The curve resembles a sawtooth wave in that the difference begins abruptly, as the reaction starts, increases monotonically as the reaction proceeds, and then drops rapidly to zero once the reaction has ceased. On the time scale used, the trailing edge of the signal is a horizontal line. The response of the transducer, $\Delta T'$, represented by the solid curve 14, is quite different. It begins gradually, after the actual change has started. This gives rise to a lagging phase shift, so that the response always lags behind the actual change in the system. When the reaction ceases, the response decays to zero in a time characteristic of the measuring system; not the actual change in the system. It is to be noted, however, that the area under the two curves is the same, so that a measurement of the area under curve 14 will give a true measure of the energy involved in the reaction.

The general heat balance equation (3) can be written for the special case of a scanning microcalorimeter. Such a device is generally composed of: a thermal source at a temperature $T_p$; a sample holder at a temperature $T_{sh}$, separated from the thermal source by a thermal path with a thermal resistance $R_D$; a sample, at a temperature $T_s$, supported on the sample holder, and separated from it by a thermal path with a thermal resistance $R_o$; a reference holder, at a temperature $T_{rh}$, separated from the thermal source by a thermal path with a thermal resistance assumed to be equal to $R_D$; and a reference, at a temperature $T_r$, supported on the reference holder, and separated from it by a thermal path with a thermal resistance assumed to be equal to $R_o$. For the sample, equation (3) can be written in the form $$dh/dt = C_s dT_s/dt - dq_s/dt \qquad (4)$$

where $$dq_s/dt = (T_s - T_{sh})/R_o = (T_{sh} - T_p)/R_D$$
$$= (T_s - T_p)/(R_o R_D) \qquad (5)$$

so that $$dh/dt = C_s dT_s/dt - (T_s - T_p)/(R_o + R_D) \qquad (6)$$

For the reference, equation (3) can be written in the form $$dh/dt = 0 = C_r dT_r/dt - dq_r/dt \qquad (7)$$

where $$dq_r/dt = (T_r - T_{rh})/R_o = (T_{rh} - T_p)/R_D = (T_r - T_p)/(R_o + R_D) \qquad (8)$$

so that:

$$0 = C_r dT_r/dt - (T_r - T_p)/(R_o + R_D) \qquad (9)$$

Subtraction of equation (9) from equation (6) yields:

$$dh/dt = C_s dT_s/dt - C_r dT_r/dt + (T_s - T_r)/(R_o + R_D) \qquad (10)$$

Setting $$\Delta T = T_s - T_r;\ T_s = \Delta T + T_r, \qquad (11)$$

equation (10) becomes:

$$\frac{dh}{dt} = C_s \frac{d}{dt}\Delta T + (C_s - C_r)\frac{d}{dt}T_r + \frac{\Delta T}{R_o + R_D}. \qquad (12)$$

REwriting the last equality in equation (5) as $$(R_o + R_D)(T_{sh} - T_p) = R_D(T_s - T_p) \qquad (5')$$

and the last equality in equation (8) as $$(R_o = R_D)(T_{rh} - T_p) = R_D(T_r - T_p) \qquad (8')$$

and subtracting equation (8') from equation (5') yields:

$$\Delta T = (R_o + R_D/R_D)(T_{sh} - T_{rh})$$

or:

$$\Delta T = (R_T/R_D)\Delta T' \qquad (13)$$

where $$R_T = R_o + R_D \qquad (14)$$

and $$\Delta T' = T_{sh} - T_{rh} \qquad (15)$$

Putting equation (13) into equation (12) yields $$\frac{dh}{dt} = C_s \frac{R_T}{R_D}\frac{d}{dt}\Delta T' + (C_s - C_r)\frac{d}{dt}T_r + \frac{\Delta T'}{R_D}. \qquad (16)$$

To determine what happens at the instant when the phase change ceases, both $dh/dt$ and $d/dt\ T_r$ can be set equal to zero, so that equation (16) becomes:

$$C_s R_T d/dt \Delta T' = -\Delta T' \qquad (17)$$

Solving equation (17) for $\Delta T'$ yields:

$$\Delta T' = \Delta T'_{max} \exp(-t/RC_s) \qquad (18)$$

which indicates that the signal decays exponentially from the peak, as expected.

With reference to FIG. 2b, in which curve 15 is a plot of the time rate of change of the response of the measuring instrument ($\Delta T'$) as a function of time, it is evident that curve 15 varies only when the slope of curve 14 changes. If the magnitude of curve 15 is adjusted and subtracted from curve 14, the result is curve 13; the actual temperature difference between the sample and reference material.

Once this fact has been realized, there are several ways in which it can be applied. Some authors have suggested graphical ways in which the desired information could be extracted from the distorted response signal. The present invention, however, was prompted by the realization that such a correction could be accomplished automatically, by constructing a lead network which would modify the distorted initial response of the measuring system by introducing the proper leading phase shift.

Figure 3:
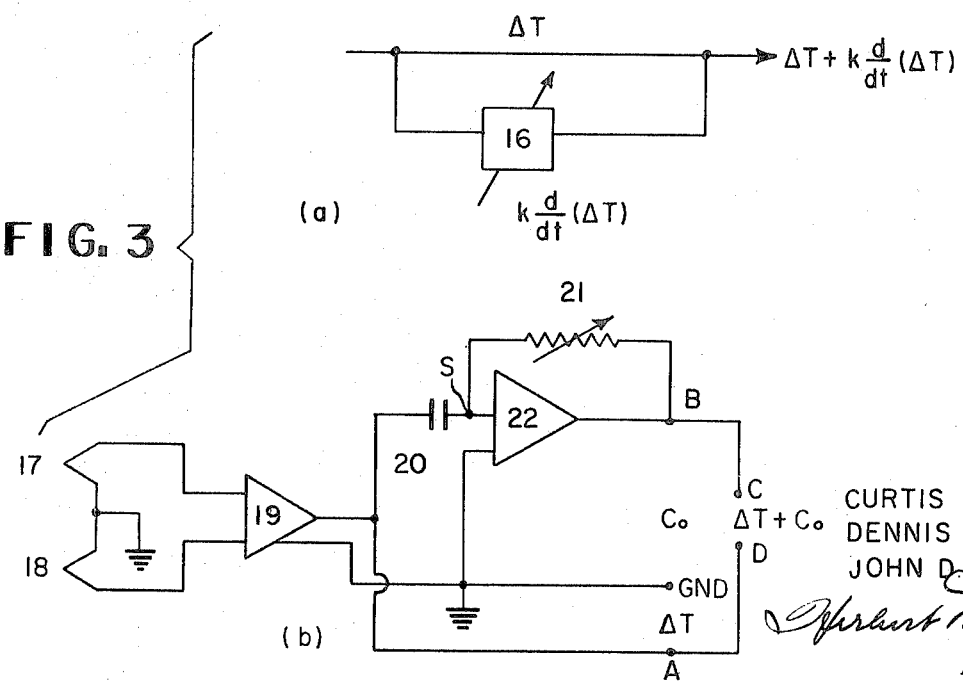
FIG. 3 shows one possible embodiment of the present invention.

FIG. 3 shows one possible embodiment of the present invention. FIG. 3a) is a block diagram of this embodiment In this embodiment, the time varying portion of the $\Delta T'$ signal is fed through a derivative circuit 16, in which both the amplitude and time constant of the derivative signal can be varied to the point where they will just compensate for the lagging phase shift introduced into the response by the reactive nature of the measuring instrument. This adjusted derivative signal is then added onto the original signal in the proper phase. FIG. 3b is a schematic diagram of one possible circuit which will accomplish this. The difference in temperature, $\Delta T$, between the sample and the reference is monitored by the thermocouple 17 and its reference lead 18, and fed through amplifier 19. The signal $\Delta T'$ that emerges from the amplifier 19 has the form of curve 14 in FIG. 2, and is passed on unchanged to point A. The remainder of the circuit comprising capacitor 20, variable resistor 21 and amplifier 22 is a differentiator. This type of circuit is well known to those skilled in the art. It is designed to give a signal proportional to the time derivative of the input signal. When the input voltage changes, a current must pass through the feedback resistor 21 to keep the summing point S at ground potential. The magnitude of this current is directly proportional to the size of the capacitor 20 and the rate of change of the input voltage. The output voltage necessary to supply this current is then poportional to the size of the feedback resistor 21, and the current through it, so the signal between point B and ground is $$e_0 = -RC\frac{d}{dt}(\Delta T') = k\frac{d}{dt}(\Delta T). \qquad (19)$$

If the signal $e_o$ is plotted as a function of time, the resultant curve is that given by curve 15 in FIG. 2b. By varying the magnitude of the resistor and the capacitor, and the amplification of the amplifier, the magnitude of $e_o$ can be varied. If $e_o$ is adjusted properly and added to $\Delta T'$, as is the case for the signal measured between points A and B in FIG. 3b, then the resultant signal cam be made to resemble curve 13 in FIG. 2a; which is the curve of the actual temperature difference, $\Delta T$, between the sample and the reference.

FIG. 4 shows two other possible embodiments of the present invention by which the correction can be accomplished. FIG. 4a is a block diagram of this embodiment. The distorted signal is passed directly through a passive lead network 23, designed to add a component proportional to the true rate of change of the distorted signal, directly to the distorted signal. This adjusted signal is then passed through an amplifier 24 to restore the signal to the proper amplitude.

FIG. rb is one possible circuit which will accomplish this. Resistor 25 and 26 form a voltage divider. If capacitor 27 were not present, the signal fed to amplifier 28 would be equal to:

$R_{26}/(R_{25}+R_{26})$ times the input signal.

If the amplifier 28 then has an amplification of $(R_{25}+R_{26})/R_{26}$ the signal out would be equal to the signal in.

If resistor 25 were not present but capacitor 27 were, the circuit would be a conventional differentiator, and the signal across resistor 26 would be proportional to the rate of change of the signal. signal In the circuit as it stands, the signal across resistor 26 is the sum of the initial signal plus a signal proportional to the time rate of change of the initial signal; both suitably reduced because of the voltage-dividing factor. When the signal across resistor 26 is passed through amplifier 28, its amplitude can be restored to the proper level. If the signal fed to this circuit is the signal of curve 14 in FIG. 2a, then, as above, a current will pass through resistor 26 which is the sum of the current passing through resistor 25 and the current required to change the charge on capacitor 27. So by measuring the voltage across resistor 26, the two signals have been effectively added. When the resultant signal is amplifier, that signal will be equivalent to curve 13 in FIG. 2a.

FIG. 4c is another possible circuit by which the modification can be accomplished. In this case, instead of using an RC differentiator circuit, an RL differentiator circuit is used. Resistors 29 and 30 still function as a voltage divider. The voltage across resistor 30 will be proportional to the initial signal, while the voltage across inductance 31 will be proportional to the time rate of change of the current produced by the initial signal. The two together, suitably amplifier by amplifier 32 give the desired signal.

These circuits are intended merely to illustrate the type of circuits which will perform the desired function and are not meant to restrict the present invention. If higher order corrections are required, two or more such derivative circuits could be used. The additional circuits would operate in much the same manner as the circuits described above except that the input to each would be in derivative form. The resultant curves would be complicated, so for purposes of illustration here, the discussion has been limited to the discussion of the operation of a single derivative circuit.

As an illustration of the effectiveness of this disclosure, we can consider the effect of the addition of the circuit shown in FIG. 2b on the response of a scanning microcalorimeter. The curve 33 in FIG. 5a is a typical plot for a sample of lead. It was run on the DuPont series 900 Thermal Analyzer. Curve 34 in FIG. 5b and curve 35 in FIG. 5c are plots of the response of the same instrument after the circuit shown in FIG. 3b was incorporated into the design. In both cases, the leading edge of the response begins abruptly and the trailing edge drops rapidly to zero. In FIG. 5b the value of the reactance of the RC circuit was not adjusted properly, and overshoot 36 occurred. In FIG. 5c, the reactance has been adjusted properly, and the curve reflects the true temperature differential between the sample and the reference as a function of time.

FIG. 6 shows a typical plot for a sample where there are two reactions within a narrow temperature range. FIG. 6a is a plot run with an unmodified instrument. FIG. 6b is a plot run with an instrument modified according to this invention. The difference in resolution between peaks 37 and 38 in FIG. 6a and peaks 40 and 41 in FIG. 6b is marked. In addition, because the leading and trailing edges of each curve in FIG. 6b are linear, it is possible to tell where each reaction begins and ends; making a determination of the energy involved in each reaction more accurate.

While this discussion has concentrated on a scanning microcalorimeter, the present invention is useful in any device for the measurement of thermal properties, and indeed any device where the initial signal is distorted because of the reactance of the measuring system. This discussion is not meant to limit the application of this invention. It is only intended to give a detailed description of how the invention works in conjunction with one device, so that those skilled in the art can evaluate its usefulness in other applications.

What is claimed is:

1. In an apparatus for performing analysis which comprises: a sample cell for receiving sample material; a means for varying the environment of said sample material; a reference cell for receiving reference material, any reference material in said reference cell being insulated from any sample material in said sample cell; m means for varying the environment of a reference material in said reference cell; means for measuring the difference in temperature between a sample material in said sample cell and said reference material in said reference cell; means responsive to said temperature difference for varying both the flow of energy between said sample material in said sample cell and at least one external source of energy and the flow of energy between said reference material in said reference cell and said external source in such manner as to equalize the temperature of said sample material and said reference material; means for independently varying the environment of both said sample material and said reference material in such manner as to cause them both to attain the same desired temperature and means for measuring the difference between the flow of energy to said sample material and the flow of energy to said reference material, said measuring means producing an initial electronic signal proportional to the response of said means to measure the difference of energy flow; the improvement wherein said apparatus further comprises circuit means for taking the derivative of said initial signal and adding said derivative to at least a portion of said initial signal said circuit means being coupled between a junction in said measuring means where said initial signal appears and the output of said measuring means whereby any lagging phase shift between said initial signal and the actual difference in the energy flow is compensated.

2. The apparatus of claim 1 wherein said circuit means is an active lead network comprising:
a. means for generating a leading phase signal proportional to the time rate of change of said initial signal;
b. means for varying the amplitude and time constant of said leading phase signal; and
c. means for adding said leading phase signal to said initial signal.

3. The apparatus of claim 2 wherein said active lead network comprises: a variable capacitor; an operational amplifier with variable amplification, said amplifier being coupled to the output of said measuring means through said capacitor; and a variable resistor connected in parallel with said amplifier.

4. The apparatus of claim 1 wherein said circuit means comprises a passive lead network and an amplifier, said passive lead network being coupled to the input of said amplifier, the reactance of said passive lead network producing a leading phase shift in said initial signal sufficient to compensate for said lagging phase shift, and said amplifier restoring the compensated signal to the level of said initial signal.

5. The apparatus of claim 4 wherein said passive lead network comprises a voltage divider with a resistance in one leg and a capacitive reactance in the other leg, said resistive leg being coupled to the input of said amplifier whereby the compensated signal across the resistive leg is fed to said amplifier.

6. The apparatus of claim 4 wherein said passive lead network comprises a voltage divider with a resistance in one leg and an inductive reactance in the other leg, said inductive leg being coupled to the input of said amplifier whereby the compensated signal across the inductive reactance leg is fed to said amplifier.

* * * * *